(12) United States Patent  
Papakipos et al.

(10) Patent No.: US 8,626,919 B1  
(45) Date of Patent: Jan. 7, 2014

(54) INSTALLER-FREE APPLICATIONS USING NATIVE CODE MODULES AND PERSISTENT LOCAL STORAGE

(75) Inventors: Matthew Papakipos, Palo Alto, CA (US); Antoine Labour, Mountain View, CA (US); Eric Uhrhane, San Francisco, CA (US)

(73) Assignee: Google Inc., Mountain View, CA (US)

( * ) Notice: Subject to any disclaimer, the term of this patent is extended or adjusted under 35 U.S.C. 154(b) by 272 days.

(21) Appl. No.: 12/267,425

(22) Filed: Nov. 7, 2008

(51) Int. Cl.  
*G06F 15/173* (2006.01)

(52) U.S. Cl.  
USPC .............................. 709/226; 717/134; 726/21

(58) Field of Classification Search  
USPC ......................................................... 709/226  
See application file for complete search history.

(56) References Cited

U.S. PATENT DOCUMENTS

| | | | | |
|---|---|---|---|---|
| 5,893,118 | A * | 4/1999 | Sonderegger ......................... 1/1 |
| 2002/0107935 | A1* | 8/2002 | Lowery et al. ................ 709/216 |
| 2003/0154265 | A1* | 8/2003 | Raffaele et al. .............. 709/221 |
| 2004/0117606 | A1* | 6/2004 | Wang et al. .................. 712/235 |
| 2004/0122785 | A1* | 6/2004 | Brown et al. ................... 706/16 |
| 2005/0071633 | A1* | 3/2005 | Rothstein ...................... 713/167 |
| 2005/0116966 | A1* | 6/2005 | Graham et al. ............... 345/661 |
| 2005/0197819 | A1* | 9/2005 | Hopkins et al. ................ 703/22 |
| 2006/0069704 | A1* | 3/2006 | Breeden et al. .............. 707/202 |
| 2007/0169108 | A1* | 7/2007 | Guillorit et al. ............. 717/174 |
| 2008/0071884 | A1* | 3/2008 | Heithcock et al. ........... 709/219 |
| 2008/0104195 | A1* | 5/2008 | Hawkins et al. ............. 709/217 |
| 2008/0168087 | A1* | 7/2008 | Repetti et al. ............. 707/103 R |
| 2008/0295024 | A1* | 11/2008 | Schneider ...................... 715/804 |
| 2009/0049258 | A1* | 2/2009 | Benoit et al. ................. 711/162 |
| 2009/0282474 | A1* | 11/2009 | Chen et al. ...................... 726/21 |
| 2009/0282477 | A1* | 11/2009 | Chen et al. ...................... 726/22 |
| 2010/0013842 | A1* | 1/2010 | Green et al. .................. 345/522 |
| 2010/0017461 | A1 | 1/2010 | Kokkevis et al. |
| 2010/0107146 | A1* | 4/2010 | Wrighton et al. ............. 717/134 |
| 2010/0115613 | A1* | 5/2010 | Ramaswami et al. .......... 726/22 |
| 2010/0118038 | A1 | 5/2010 | Labour et al. |

* cited by examiner

*Primary Examiner* — Hamza Algibhah  
(74) *Attorney, Agent, or Firm* — Fish & Richardson P.C.

(57) ABSTRACT

Some embodiments provide a system that executes an application. During operation, the system obtains a resource list associated with the application and stores a set of resources including a native code module from the resource list through communications over a network connection, wherein the resources are stored in persistent local storage. The application then loads the application in the web browser and loads the native code module into a secure runtime environment. Next, the application executes the application independently of the network connection using the native code module and the stored resources.

27 Claims, 3 Drawing Sheets

INSTALLER-FREE APPLICATIONS USING NATIVE CODE MODULES AND PERSISTENT LOCAL STORAGE

BACKGROUND

1. Field

The present embodiments relate to techniques for executing applications on computer systems. More specifically, the present embodiments relate to a method and system for executing installer-free applications using native code modules.

2. Related Art

Computer systems may include a number of native applications that require significant processing resources to execute. Such applications may perform tasks such as image processing, audio and video decoding and mixing, mathematical modeling, and/or simulation. To run efficiently, these applications are often written in a combination of general-purpose programming languages, such as C or C++, and low-level languages, such as assembly language. Consequently, the applications may be restricted to specific platforms, may involve a lengthy installation process, and may pose a security risk to the computer systems on which the applications are installed.

On the other hand, web applications, which have become more prevalent in recent years, are typically written in scripting languages that are more secure and require no installation. However, web applications may lack the performance capabilities of native applications. In particular, a web application may run one or two orders of magnitude more slowly than a native application. Furthermore, web applications are often unable to operate without sending and receiving data with one or more servers through a network connection with the servers. As a result, web applications are currently unable to implement computationally intensive functions that are available in native applications and may also lack the ability to execute independently of a network connection.

SUMMARY

Some embodiments provide a system that executes an application. During operation, the system obtains a resource list associated with the application and stores a set of resources including a native code module from the resource list obtained through communications over a network connection, wherein the resources are stored in persistent local storage. The application then loads the application in the web browser and loads the native code module into a secure runtime environment. Next, the application executes the application independently of the network connection using the native code module and the stored resources.

In some embodiments, the system also intercepts a network request for one of the resources from the web browser and serves the network request using the stored resources.

In some embodiments, the system also periodically updates the stored resources using the network connection.

In some embodiments, the system also validates the native code module prior to loading the native code module into the secure runtime environment.

In some embodiments, executing the application independently of the network connection involves locally storing data associated with the application and synchronizing the data with a server using the network connection.

In some embodiments, one or more of the stored resources are used to render graphics for the application.

In some embodiments, the stored resources further include at least one of a document, a web script, a media file, and a graphics-processing module.

In some embodiments, the resource list is obtained based on at least one of a user of the application and a state of the application.

In some embodiments, the application is loaded and executed without an installation procedure involving the user.

DETAILED DESCRIPTION

Figure 1A:
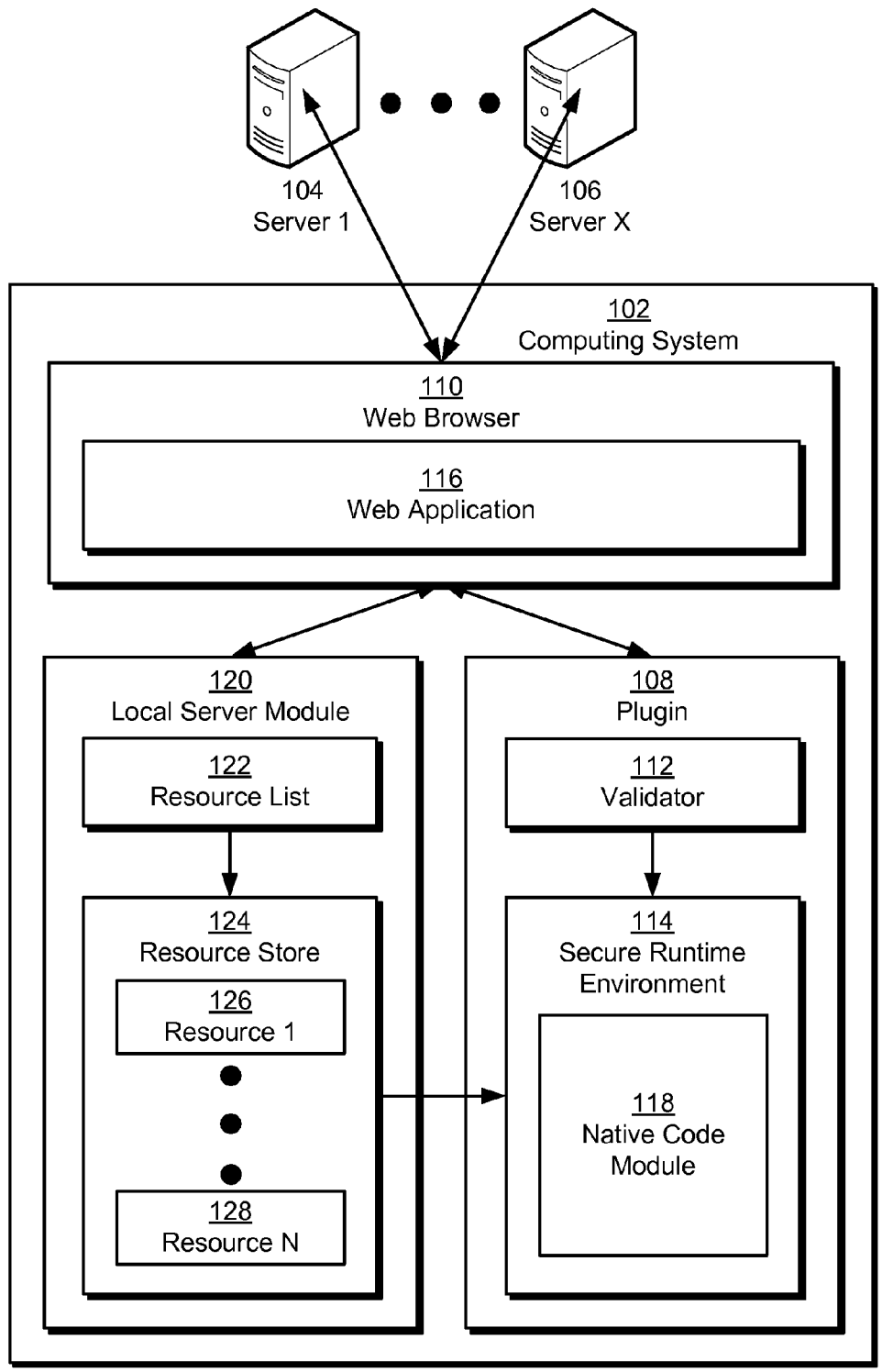
FIG. 1A shows a schematic of an embodiment of a system.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The described embodiments provide a method and system for executing an application. This application may correspond to a web application that is loaded in a web browser and executed on a computing system such as a personal computer (PC), a mobile phone, a personal digital assistant (PDA), a graphing calculator, a portable media player, a global positioning system (GPS) receiver, and/or another electronic computing device. In addition, the web application may be obtained by the computing system from a server and execute through communications with the server over the network connection.

More specifically, embodiments provide a method and system for executing the web application as a native application using a native code module. The native code module contains native code that is executed within a secure runtime environment. The web application may further be executed independently of the network connection by storing the native code module and/or other resources associated with the web application on the computing system. Subsequent network requests for the resources may be intercepted and served using the stored resources. As a result, the native code module and other stored resources may allow the application to be executed independently of the network connection and/or loaded without an installation procedure involving a user of the application.

FIG. 1A shows a schematic of an embodiment of a system. The system includes a computing system 102 and a set of servers (e.g., server 1 104, server x 106). Computing system 102 includes a web application 116 running within a web browser 110 and a plugin 108. Each of these components is described in further detail below.

Computing system 102 may correspond to an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (not shown) that coordinates the use of hardware and software resources on computing system 102, as well as one or more applications (e.g., web browser 110, web application 116) that perform specialized tasks for the user. For example, computing system 102 may include applications such as an email client, address book, document editor, web browser 110, and/or media player. To perform tasks for the user, applications may obtain the use of hardware resources (e.g., processor, memory, I/O components, wireless transmitter, etc.) on computing system 102 from the operating system, as well as interact with the user through a hardware and/or software framework provided by the operating system, as described below.

Those skilled in the art will appreciate that computing system 102 may include functionality to execute both native applications and non-native applications. In other words, computing system 102 may include native applications, such as web browser 110, that are locally installed on computing system 102 and specific to the operating system and/or one or more hardware devices on computing system 102. Such applications may be compiled into native (e.g., machine) code that executes directly on one or more central processing units (CPUs) of computing system 102. Code execution in the applications may further be optimized by writing the applications in a combination of general-purpose programming languages (e.g., C, C++, etc.) and assembly language, as well as utilizing libraries that provide hardware acceleration (e.g., graphics hardware acceleration) to the applications. However, the installation of native applications may compromise computing system 102 and private data stored on computing system 102.

Computing system 102 may also include functionality to execute platform-independent, non-native applications. In particular, computing system 102 may obtain web application 116 from one or more servers (e.g., server 1 104, server x 106) using a network connection with the server(s) and load web application 116 in web browser 110. For example, web application 116 may be downloaded from an application server over the Internet by web browser 110.

Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface elements such as menus, buttons, windows, sub-windows, icons, animations, and/or other graphical objects that emulate analogous user interface elements in native applications. In other words, web application 116 may correspond to a rich Internet application (RIA).

Furthermore, web application 116 may execute on computing system 102 regardless of the type of platform (e.g., operating system, drivers, etc.) associated with computing system 102. Though platform-independent applications such as web application 116 may be more portable and secure than native applications, such cross-platform applications may lack certain performance and execution capabilities of native applications.

More specifically, non-native applications such as web application 116 may be written using scripting languages that are interpreted rather than compiled, such as JavaScript (JavaScript™ is a registered trademark of Sun Microsystems, Inc.). The interpreted nature of web application 116 and/or other non-native applications may result in significantly slower execution times for the non-native applications than those of compiled native applications. Non-native applications may also be unable to utilize low-level libraries and/or application programming interfaces (API) that are available for use by native applications. Consequently, non-native applications may provide limited functionality in certain tasks.

In addition, web application 116 may be unable to execute without a network connection with one or more servers (e.g., server 1 104, server x 106) associated with web application 116. For example, web application 116 may require communications with the server(s) to send and receive data, retrieve code modules, load web pages, and/or otherwise perform tasks for the user. Attempts to load and/or access web application 116 without the network connection may result in errors, such as HyperText Transfer Protocol (HTTP) errors, and/or other issues that interfere with the execution of web application 116. As a result, web application 116 may be limited in the ability to operate in standalone mode (e.g., without a network connection).

To provide computationally intensive features to the user, a native code module 118 associated with web application 116 may be used to execute computationally intensive code on behalf of web application 116. Like web application 116, native code module 118 may be obtained from one or more servers (e.g., server 1 104, server x 106) by web browser 110. For example, web application 116 may provide a hyperlink to native code module 118 on the Internet. Web browser 110 may then download native code module 118 from the Uniform Resource Locator (URL) specified in the hyperlink. Alternatively, native code module 118 may be specified by the user or by an external source, such as another web application and/or a native application. Execution of computationally intensive code for web applications using native code modules is described in a co-pending non-provisional application by inventors Evangelos Kokkevis, Matthew Papakipos, and David C. Sehr, entitled "Method and System for Executing Applications Using Native Code Modules," having Ser. No. 12/266,602 and filing date Nov. 7, 2008, which is incorporated herein by reference.

In one or more embodiments, native code module 118 is executed by a plugin 108 associated with web browser 110. In one or more embodiments, plugin 108 includes a variety of mechanisms to ensure the safe execution of native code module 118. In particular, native code module 118 may be validated by a validator 112 provided by plugin 108 prior to execution. During operation, the computing system 102 receives the native code module 118, which is comprised of untrusted native program code expressed using native instructions in the instruction set architecture associated with the computing system 102. The computing system 102 validates the native code module 118 to confirm that it will execute safely by: (1) determining that the set of instructions in the native code module 118 do not include any restricted instructions and/or do not access restricted features of the computing system 102; and (2) determining that the set of instructions in the native code module 118 are aligned along byte boundaries such that a specified set of byte boundaries always contain a valid instruction and a set of control flow instructions in the native code module 118 have valid targets. The computing system 102 then allows valid (e.g., successfully validated) native code modules to execute, and rejects native code modules that fail validation. Native code module validation is described in a co-pending non-provisional application by inventors J. Bradley Chen, Matthew T. Harren, Matthew Papakipos, David C. Sehr, and Bennet S. Yee, entitled "Method for Validating an Untrusted Native Code Module," having Ser. No. 12/117,634, and filing date 8 May 2008, which is incorporated herein by reference.

Once native code module 118 is validated, native code module 118 may be loaded into a secure runtime environment 114 provided by plugin 108. (Note that this secure runtime environment need not actually be part of the browser at all. It could be a separate application with which the browser communicates.) Native code execution in a secure runtime environment is described in a co-pending non-provisional application by inventors J. Bradley Chen, Matthew T. Harren, Matthew Papakipos, David C. Sehr, Bennet S. Yee, and Gregory Dardyk, entitled "Method for Safely Executing an Untrusted Native Code Module on a Computing Device," having Ser. No. 12/117,650, and filing date 8 May 2008, which is incorporated herein by reference. Secure runtime environment 114 may also be provided by a web browser extension to web browser 110, and/or secure runtime environment 114 may be built into web browser 110.

Furthermore, because native code module 118 may include binary code that runs directly on hardware, native code module 118 may be platform-independent with respect to the operating system of computing system 102, web browser 110, and/or other software components on computing system 102. As described in the above-referenced applications, plugin 108 and/or native code module 118 may also include mechanisms for executing on a variety of instruction set architectures, including the use of "fat binaries" and binary translators. Consequently, the validation and execution of native code module 118 may enable web application 116 to safely utilize natively executing code in performing tasks for the user.

In one or more embodiments, native code module 118 corresponds to a graphics-processing module that enables hardware-accelerated graphics for web application 116. The use of native code module 118 to render graphics for web application 116 is described in further detail below with respect to FIG. 1B.

In one or more embodiments, a local server module 120 associated with web browser 110 is used to enable execution of web application 116 independently of a network connection with the server(s). As with plugin 108, local server module 120 may be implemented as a browser plugin to web browser 110, a web browser extension to web browser 110, and/or a component of web browser 110. To enable offline execution of web application 116, local server module 120 may obtain a resource list 122 associated with web application 116 from the server(s). For example, resource list 122 may be obtained from a Uniform Resource Locator (URL) specified by web application 116 using the network connection.

Resource list 122 may correspond to a file that contains a set of resources (e.g., resource 1 126, resource n 128) required for execution of web application 116. For example, resource list 122 may include a set of URLs for resources such as documents (e.g., HyperText Markup Language (HTML) documents, Portable Document Format (PDF) documents, word processing documents, spreadsheets, etc.), web scripts (e.g., JavaScript code modules), media files (e.g., audio files, images, video files, etc.), and/or native code module 118.

Local server module 120 may then use resource list 122 to retrieve the resources through communications over the network connection and store the resources in a local resource store 124, which can comprise persistent, non-volatile storage. For example, local server module 120 may store the resources in a local directory on computing system 102. Local server module 120 may also implement a storage mechanism (e.g., a relational database) for local storage of data associated with web application 116. Native code module 118 may then be provided to plugin 108 from local resource store 124 and used to perform computationally intensive tasks for the user. Furthermore, the storing of native code module 118 and/or other resources used by web application 116 may allow local server module 120 to intercept and serve network requests for the resources from web browser 110 using local resource store 124.

In particular, local server module 120 may intercept a network request (e.g., an HTTP request) for a resource associated with web application 116 if the resource is stored in local resource store 124 and serving of network requests from local resource store 124 is enabled. For example, local server module 120 may serve the network request from local resource store 124 if the resource store 124 is enabled for serving and/or if a cookie associated with the resource specifies that the resource is to be served from resource store 124. If serving of the network request for the resource from resource store 124 is enabled, local server module 120 may serve the network request using resource store 124 regardless of the availability of a network connection between computing system 102 and the server(s). Consequently, the use of resource store 124 by local server module 120 may allow web application 116 to be executed independently of the network connection (e.g., in standalone mode). In other words, requests for data, code modules, and/or other resources by web application 116 may be served from resource store 124 by local server module 120 in lieu of the server(s) and a network connection with the servers.

Local server module 120 may also include functionality to periodically update the resources in resource store 124 if a network connection is available. More specifically, local server module 120 may allow for both manual and automatic updates to resources in resource store 124. For example, local server module 120 may receive a request for a manual update from web application 116 upon the initial loading of web application 116 by web browser 110. Similarly, local server module 120 may automatically update resource store 124 upon intercepting and serving network requests for resources using resource store 124. Alternatively, local server module 120 may update resource store 124 and/or limit updates to resource store 124 to a pre-specified frequency (e.g., once every ten seconds). Because updates to web application 116 may be performed by local server module 120 without user intervention, web application 116 may be loaded and executed without an installation procedure involving the user.

To update resources in resource store 124, local server module 120 may obtain the latest version of resource list 122 using the network connection and compare the latest version with the version of resource list 122 used to populate resource store 124. If the versions are different, the resources in resource store 124 are updated using the new (e.g., latest) version of resource list 122. For example, resource list 122 and resource store 124 may each include numeric versions that denote the current set of resources used by web application 116. Differences between the versions of resource list 122 and resource store 124 may prompt an update of the resources. For example, a change in resource list 122 version from "1" to "2" may trigger an update, as well as a change in version from "2" to "1."

As the resources are updated, network requests for the resources may continue to be served from resource store 124. The version of resource store 124 may then be updated to the latest version (e.g., the version of resource list 122) once the update has completed. Moreover, the update may be retried if the version of resource list 122 has changed during the update.

In one or more embodiments, resource list 122 is obtained based on the user of web application 116 and/or a state of web application 116. For example, resource list 122 may be obtained based on the user's authentication credentials and/or access privileges to one or more components of web application 116. Along the same lines, resource list 122 may contain different sets of resources as the user and/or web application 116 requests use of the resources. For example, web application 116 may correspond to a computer game that specifies different resource lists for different stages of the computer game. Instead of downloading all resources required for the computer game when the game first loads, local server module 120 may update resource list 122 and resource store 124 as the user progresses through the computer game so that new stages are obtained and loaded as the user encounters the new stages.

In one or more embodiments, executing web application 116 independently of a network connection involves locally storing data associated with web application 116 and synchronizing the data with the server(s) if the network connection is available. As described above, data associated with web application 116 may be stored in a relational database and/or another local storage mechanism. However, unlike other resources used by web application 116 (e.g., native code module 118), updates to the data may involve both sending and receiving changes to the data using the network connection. For example, web application 116 may correspond to a web-based email client that synchronizes data with the server(s) by retrieving new emails in the user's inbox from the server(s) and sending offline changes made by the user (e.g., new emails, deleted emails, etc.) to the server(s) when a network connection is available.

Figure 1B:
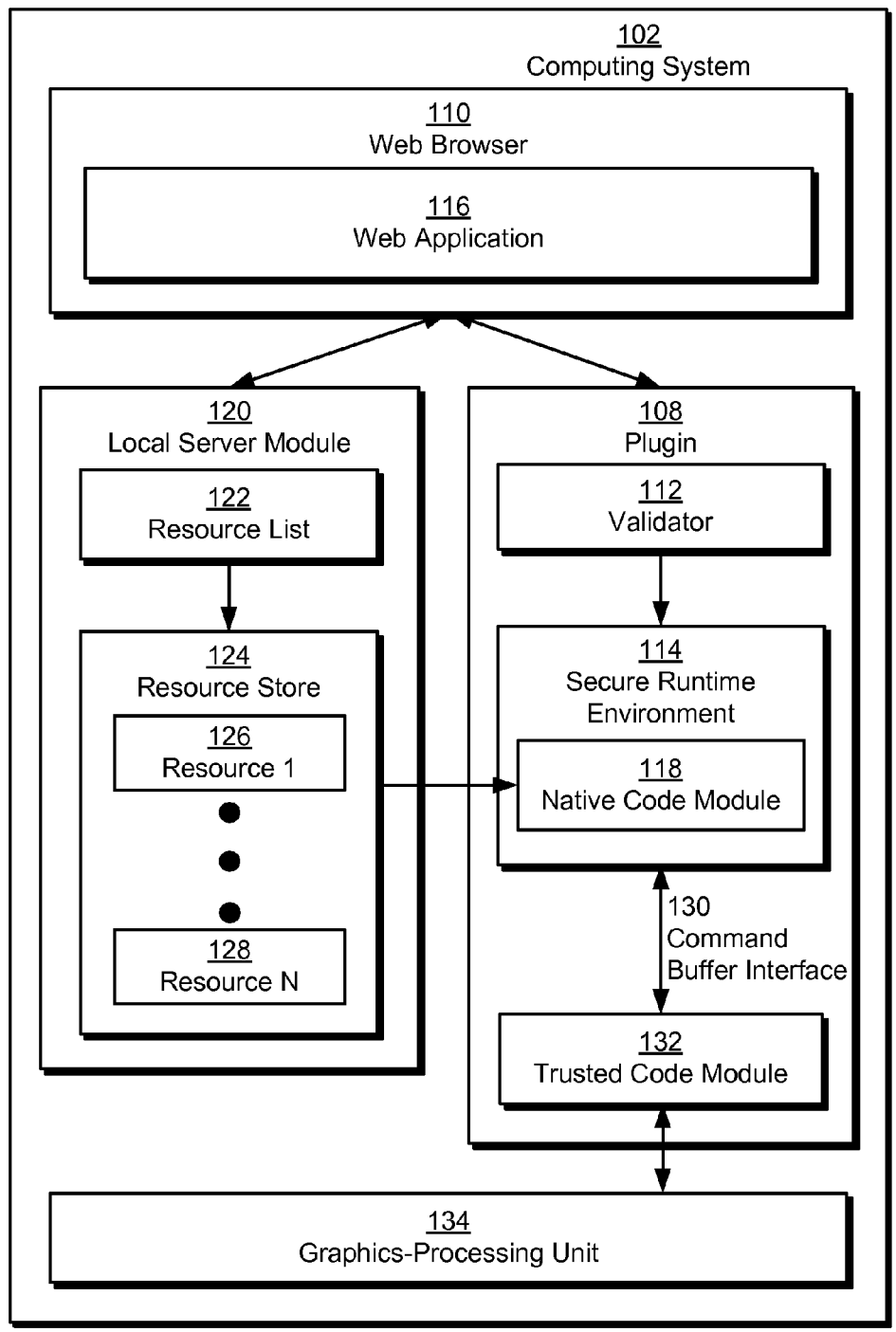
FIG. 1B shows a schematic of an embodiment of a system.

FIG. 1B shows a schematic of an embodiment of a system. More specifically, FIG. 1B shows a system for rendering graphics for web application 116 within computing system 102. As with FIG. 1A, the system of FIG. 1B allows web application 116 to execute independently of a network connection using local server module 120, resource list 122, and resource store 124. The system of FIG. 1B also includes functionality to validate and execute native code module 118 using plugin 108, validator 112, and/or secure runtime environment 114.

To enable hardware-accelerated graphics for web application 116, native code module 118 communicates with a trusted code module 132 through a command buffer interface 130. Trusted code module 132 then sends rendering commands to a graphics-processing unit (GPU) 134 on computing system 102, which renders graphics for web application 116 by executing the rendering commands. Web-based graphics rendering using browser plugins is described in a co-pending non-provisional application by inventors Robin Green, Evangelos Kokkevis, Matthew Papakipos and Gregg Tavares, entitled "Web-Based Graphics Rendering System," having Ser. No. 12/174,586 and filing date 16 Jul. 2008, which is incorporated herein by reference. Hardware-accelerated graphics rendering for web applications using native code modules is described in a co-pending non-provisional application by Antoine Labour and Matthew Papakipos, entitled "Hardware-Accelerated Graphics for Web Applications Using Native Code Modules," having Ser. No. 12/267,095 and filing date Nov. 7, 2008, which is incorporated herein by reference.

In one or more embodiments, native code module 118 corresponds to a graphics-processing module such as a scene-graph renderer or a graphics library. As mentioned previously, native code module 118 and/or other resources used by web application 116 may be obtained from one or more servers using a network connection and stored in resource store 124 by local server module 120 to enable offline execution of web application 116. For example, native code module 118 may be stored to enable offline execution of a computer game, computer-aided design (CAD) tool, a video editing application, and/or a photo editing application.

Figure 2:
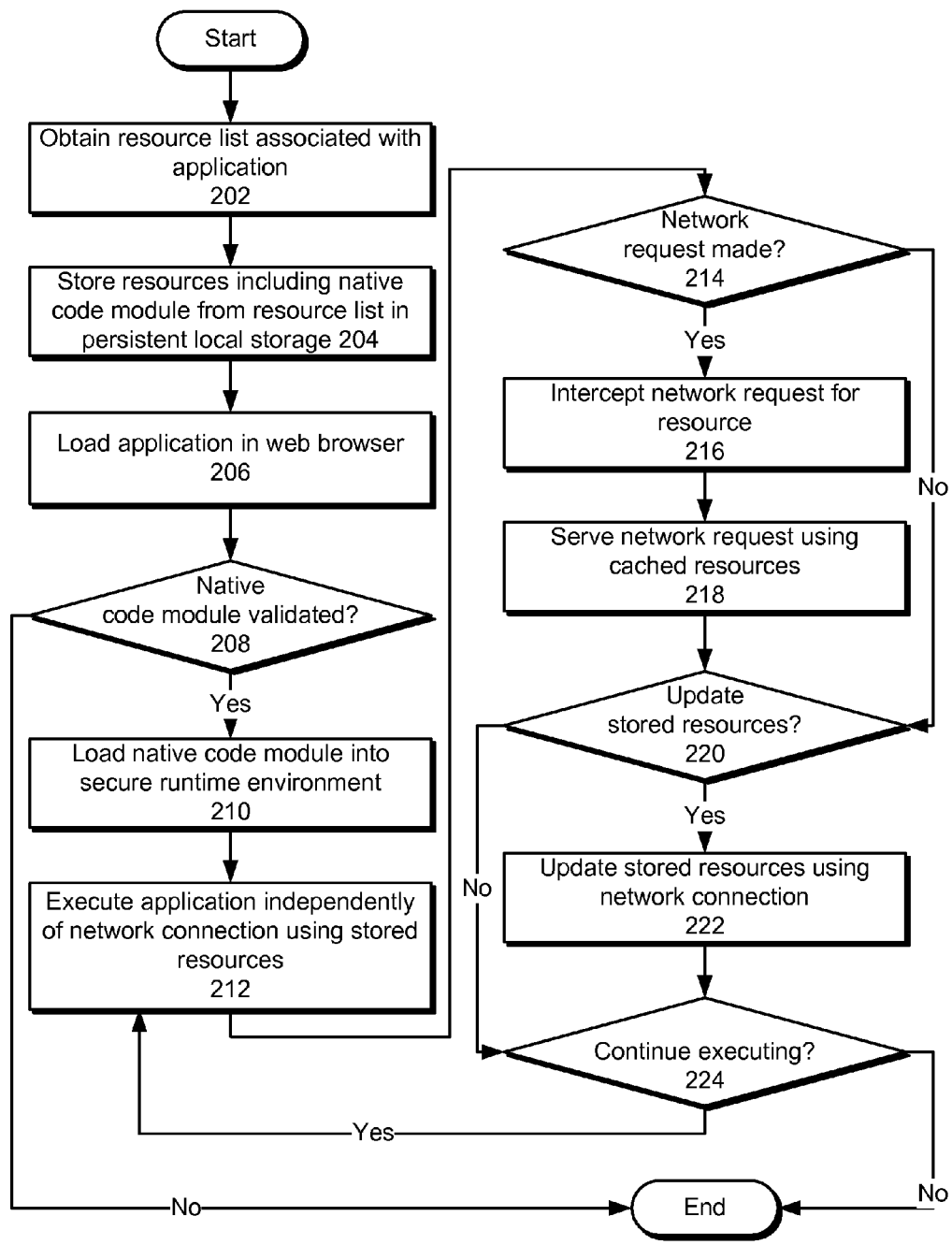
FIG. 2 shows a flowchart illustrating the process of executing an application.

FIG. 2 shows a flowchart illustrating the process of executing an application. In one or more embodiments, one or more of the steps may be omitted, repeated, and/or performed in a different order. Accordingly, the specific arrangement of steps shown in FIG. 2 should not be construed as limiting the scope of the technique.

Initially, a resource list associated with the application is obtained (operation 202). The application may correspond to a web application that performs tasks for a user, such as web application 116 of FIGS. 1A-1B. The resource list may be obtained from a URL specified by the application using a network connection. The resource list may further be obtained based on factors such as the user of the application and/or the state of the application. Next, a set of resources from the resource list, including a native code module, is stored in local persistent storage (operation 204). For example, the resources may be stored in a local directory and/or a local relational database. In addition to the native code module, the resources may include documents, web scripts, media files, graphics-processing modules, and/or other resources required or used by the application to execute. Next, the application is loaded in a web browser (operation 206).

The native code module may also be validated (operation 208) prior to executing the native code module. If the native code module is found to be invalid, the native code module is discarded without having been executed. If the native code module is successfully validated, the native code module is loaded into a secure runtime environment (operation 210). The secure runtime environment may be provided by a plugin associated with the web browser, a browser extension to the web browser, and/or a component within the web browser.

The application may then be executed independently of the network connection using the stored resources (operation 212) and the native code module. In particular, the storing of the native code module and other resources used by the application may allow the application to execute in standalone mode regardless of the presence of a network connection. Network requests made (operation 214) by the web browser for a resource may be intercepted (operation 216) and served using the stored resources (operation 218) if serving of the resource from the resource store is enabled. If no network requests associated with the application are made, no interception and redirection is required. Standalone execution of the application may further involve locally storing data associated with the application when the network connection is unavailable and synchronizing the data with a server when the network connection is available.

The stored resources may also be updated (operation 220) if the network connection is available. For example, the stored resources may be manually updated by the application (e.g., upon initial loading of the application), or the stored resources may automatically be updated periodically or upon serving a network request from the stored resources. If the stored resources are to be updated, the stored resources are updated using the network connection (operation 222). More specifically, the stored resources may be updated based on changes to the resource list (e.g., different versions of the resource list). Note that the stored resources could theoretically be updated by a client-side application as well.

The application may continue executing (operation 224) with or without the presence of a network connection. For example, the application may execute until the user is finished using the application. If execution is to continue, the application is executed independently of the network connection using the stored resources (operation 212). Network requests for the resources may be intercepted and served using the stored resources (operations 214-218), and updates to the stored resources may be periodically made if a network connection is available (operation 222). As a result, the use of the native code module and the storing of resources may allow the application to provide native performance, hardware graphics acceleration, and/or offline execution to the user in a secure environment.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present embodiments. The scope of the embodiments is defined by the appended claims.

What is claimed is:

1. A method comprising:
obtaining in a computing system a resource list over a network connection, wherein the resource list identifies resources associated with an application, the application providing functionality to a user of the application when the application is executed using the resources identified in the resource list;
obtaining the resources through communications over the network connection and storing the resources in local storage, the local storage being on the computing system and accessible by the computing system without the network connection, wherein the resources include a native code module that includes binary code that can run directly on a central processing unit of the computing system;
loading the application in a web browser on the computing system;
loading the native code module into a secure runtime environment on the computing system;
executing the web browser and the application on the computing system independently of the network connection, including executing the binary code of the native code module in the secure runtime environment directly on the central processing unit of the computing system on which the web browser and the application are executing, wherein the binary code is executed on behalf of the application to provide to a user of the application one or more features of the functionality of the application; and
validating the native code module, wherein the validating includes determining that the set of instructions in the native code module do not include any restricted instructions and do not access restricted features of the computing system, prior to executing the native code module in the secure runtime environment.

2. The method of claim 1, further comprising:
intercepting a network request from the web browser while the application is executing on the computing system independently of the network connection; and
serving the network request using the resources that are stored in the local storage.

3. The method of claim 1, further comprising:
periodically updating the stored resources using the network connection.

4. The method of claim 1, further comprising:
storing data associated with the application in the local storage; and
synchronizing the data with a server using the network connection.

5. The method of claim 1, wherein the native code module is used by the application to render graphics for the application.

6. The method of claim 1, wherein the stored resources further include at least one of a document, a web script, a media file, and a graphics-processing module.

7. The method of claim 1, wherein the resource list is obtained based on at least one of a user of the application and a state of the application.

8. The method of claim 7, wherein the application is loaded and executed without an installation procedure involving the user.

9. A system comprising:
one or more processors;
a web browser configured to load an application;
a local server module configured to:
obtain a resource list over a network connection, wherein the resource list identifies resources associated with the application, the application providing functionality to a user of the application when the application is executed using the resources identified in the resource list; and
obtain the resources through communications over a network connection, and store the resources in local storage, the local storage being on the system and accessible by the local server module without the network connection, wherein the resources include a native code module that includes binary code that can run directly on a central processing unit of the computing system;
a secure runtime environment configured to execute the web browser and the application on the system independently of the network connection, including execute the binary code of the native code module directly on the central processing unit of the computing system on which the web browser and the application are being executed, wherein the binary code is executed on behalf of the application to provide to a user of the application one or more features of the functionality of the application; and a validator configured to validate the native code module including determining that the set of instructions in the native code module do not include any restricted instructions and do not access restricted features of the computing system, prior to executing the native code module.

10. The system of claim 9, wherein the local server module is further configured to:
   intercept a network request from the web browser while the application is executing on the system independently of the network connection; and
   serve the network request using the resources that are stored in the local storage.

11. The system of claim 9, wherein the local server module is further configured to:
   periodically update the stored resources using the network connection.

12. The system of claim 9, wherein the local server module is further configured to:
   store data associated with the application in the local storage; and
   synchronize the data with a server using the network connection.

13. The system of claim 9, wherein the native code module is used by the application to render graphics for the application.

14. The system of claim 9, wherein the stored resources further include at least one of a document, a web script, a media file, and a graphics-processing module.

15. The system of claim 9, wherein the resource list is obtained based on at least one of a user of the application and a state of the application.

16. The system of claim 15, wherein the application is loaded and executed without an installation procedure involving the user.

17. A non-transitory computer-readable storage medium storing instructions that when executed by a computer cause the computer to perform a method for executing an application, the method comprising:
   obtaining in the computer a resource list over a network connection, wherein the resource list identifies resources associated with the application, the application providing functionality to a user of the application when the application is executed using the resources identified in the resource list;
   obtaining the resources through communications over the network connection, and storing the resources in local storage, the local storage being on the computer and accessible by the computer without the network connection, wherein the resources include a native code module that includes binary code that can run directly on a central processing unit of the computer;
   loading the application in the web browser;
   loading the native code module into a secure runtime environment;
   executing the web browser and the application on the computer independently of the network connection, including executing the binary code of the native code module in the secure runtime environment directly on the central processing unit of the computer on which the web browser and the application are executing, wherein the binary code is executed on behalf of the application to provide to a user of the application one or more features of the functionality of the application; and
   validating the native code module, wherein the validating includes determining that the set of instructions in the native code module do not include any restricted instructions and do not access restricted features of the computing system, prior to executing the native code module in the secure runtime environment.

18. The computer-readable storage medium of claim 17, the method further comprising:
   intercepting a network request from the web browser while the application is executing on the computer independently of the network connection; and
   serving the network request using the resources that are stored in the local storage.

19. The computer-readable storage medium of claim 17, the method further comprising:
   periodically updating the stored resources using the network connection.

20. The computer-readable storage medium of claim 17, the method further comprising:
   storing data associated with the application in the local storage; and
   synchronizing the data with a server using the network connection.

21. The computer-readable storage medium of claim 17, wherein the native code module is used by the application to render graphics for the application.

22. The computer-readable storage medium of claim 17, wherein the stored resources further include at least one of a document, a web script, a media file, and a graphics-processing module.

23. The computer-readable storage medium of claim 17, wherein the resource list is obtained based on at least one of a user of the application and a state of the application.

24. The computer-readable storage medium of claim 23, wherein the application is loaded and executed without an installation procedure involving the user.

25. The method of claim 1, wherein the native code module is used by the application to provide computationally intensive features to the user on behalf of the application.

26. The system of claim 9, wherein the native code module is used by the application to provide computationally intensive features to the user on behalf of the application.

27. The computer-readable storage medium of claim 17, wherein the native code module is used by the application to provide computationally intensive features to the user on behalf of the application.

* * * * *